(12) United States Patent
Lee et al.

(10) Patent No.: US 12,220,902 B2
(45) Date of Patent: Feb. 11, 2025

(54) WINDOW TRANSFER METHOD AND WINDOW MANUFACTURING METHOD USING THE SAME

(71) Applicant: Samsung Display Co., Ltd., Yongin-si (KR)

(72) Inventors: Seungjun Lee, Cheonan-si (KR); Hanggyun Park, Suwon-si (KR); Leegu Han, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 424 days.

(21) Appl. No.: 17/712,025

(22) Filed: Apr. 1, 2022

(65) Prior Publication Data

US 2022/0371315 A1    Nov. 24, 2022

(30) Foreign Application Priority Data

May 21, 2021    (KR) .................. 10-2021-0065441

(51) Int. Cl.
  *B32B 38/18*  (2006.01)
  *B32B 37/10*  (2006.01)
  *B32B 37/12*  (2006.01)

(52) U.S. Cl.
  CPC .......... *B32B 38/1858* (2013.01); *B32B 37/10* (2013.01); *B32B 37/1284* (2013.01); *B32B 38/1808* (2013.01); *B32B 2305/026* (2013.01)

(58) Field of Classification Search
  CPC ............ B32B 17/06; B32B 2037/1253; B32B 2038/0076; B32B 2305/026; B32B 2315/08; B32B 2323/04; B32B 2551/00; B32B 2571/00; B32B 37/10; B32B 37/1284; B32B 37/18; B32B 37/182; B32B 38/1808; B32B 38/1858; B32B 7/12
  See application file for complete search history.

(56) References Cited

U.S. PATENT DOCUMENTS

2022/0371315 A1*  11/2022  Lee ............... B32B 38/1858

FOREIGN PATENT DOCUMENTS

| CN | 115367474 A | * | 11/2022 | ............ B32B 37/10 |
| JP | H 0855896 A | | 2/1996 | |
| KR | 10-0550648 B1 | | 2/2006 | |
| KR | 10-1086191 B1 | | 11/2011 | |

OTHER PUBLICATIONS

Translation of KR20210109831.*

* cited by examiner

*Primary Examiner* — Sonya M Sengupta
(74) *Attorney, Agent, or Firm* — Lewis Roca Rothgerber Christie LLP

(57) ABSTRACT

A window transfer method and a window manufacturing method using a window transfer method are provided. A window transfer method includes preparing a stage, transferring the stage over a loading part on which a window layer is loaded, transferring the stage to be adjacent to an upper surface of the window layer and to allow a plurality of protrusion parts attached to side surfaces of the stage to press a slip sheet layer arranged under the window layer and exposed outside the window layer, and suctioning the window layer to a lower surface of the stage to separate the window layer from the slip sheet layer.

7 Claims, 15 Drawing Sheets

WINDOW TRANSFER METHOD AND WINDOW MANUFACTURING METHOD USING THE SAME

CROSS-REFERENCE TO RELATED APPLICATION

This application claims priority to and the benefit of Korean Patent Application No. 10-2021-0065441, filed on May 21, 2021 in the Korean Intellectual Property Office, the entire content of which is hereby incorporated by reference.

BACKGROUND

1. Field

Aspects of embodiments of the present disclosure relate to a window transfer method and a window manufacturing method using a window transfer method.

2. Description of the Related Art

Electronic devices that provide images to a user, such as a smartphone, a digital camera, a notebook computer, a navigation unit, and a smart television, include a display device to display the images. The display device generates the images and provides the images to the user through a display screen thereof.

The display device may be provided with a window attached thereto to protect a display panel and a touch sensing unit from external scratches and impacts. The window may include a plurality of glass layers.

As a size of the glass layers gradually increases and a thickness of the glass layers gradually decreases, a center portion of the glass layers may be more susceptible to sagging, and, thus, it may be difficult to transport the glass layers from a cassette.

Accordingly, the glass layers of a large-area thin plate may be stacked together with a slip sheet and then shipped to a facility. In this case, when transferring the glass layers, it may not be possible to use a fork-shaped robot hand. When the fork-shaped robot hand is used, static electricity is generated, and the slip sheet is transferred together with the glass layer. As a result, the glass layers are damaged.

SUMMARY

According to an aspect of embodiments of the present disclosure, a window transfer method is provided which is capable of preventing or substantially preventing a window from being damaged due to a static electricity generated when the window of a large-area thin plate is transferred.

According to another aspect of embodiments of the present disclosure, a window manufacturing method using such a window transfer method is provided.

According to one or more embodiments of the inventive concept, a window transfer method includes preparing a stage, transferring the stage over a loading part on which a window layer is loaded, transferring the stage to be adjacent to an upper surface of the window layer and to allow a plurality of protrusion parts attached to side surfaces of the stage to press a portion of a slip sheet layer, which is arranged under the window layer and exposed outside the window layer, and suctioning the window layer to a lower surface of the stage to separate the window layer from the slip sheet layer.

The stage may not be in contact with the slip sheet layer.

The protrusion parts may be located outside the window layer and may not be in contact with the window layer.

The window transfer method may further include attaching a porous layer to the lower surface of the stage, and the window layer may be in contact with the porous layer and may be vacuum-suctioned to the stage.

The window layer may be suctioned to the lower surface of the stage sequentially from a center portion of the window layer to an outer portion of the window layer when the window layer is suctioned to the lower surface of the stage.

The porous layer may include ultrahigh molecular weight polyethylene.

The slip sheet layer may be separated from the window layer by the protrusion parts without being suctioned to the stage.

The window layer may include a glass material.

The stage may be transferred by a robot arm.

The window layer may be floated by a plurality of negative pressure holes defined in the lower surface of the stage.

The window layer may not be in contact with the stage.

According to one or more embodiments of the inventive concept, a window manufacturing method includes providing a dummy adhesive layer on a dummy substrate, suctioning a window layer to a stage to separate the window layer arranged on a slip sheet layer from the slip sheet layer, transferring the window layer using the stage to arrange the window layer on the dummy adhesive layer, pressing the window layer to attach the window layer to the dummy substrate, and curing the dummy adhesive layer. The suctioning of the window layer to the stage to separate the window layer from the slip sheet layer includes pressing the slip sheet layer arranged under the window layer and exposed outside the window layer using a plurality of protrusion parts attached to side surfaces of the stage and suctioning the window layer to a lower surface of the stage to separate the window layer from the slip sheet layer.

The window manufacturing method may further include attaching a porous layer to the lower surface of the stage, and the window layer may be in contact with the porous layer and may be vacuum-suctioned to the stage.

The slip sheet layer may be separated from the window layer by the protrusion parts without being suctioned to the stage.

The window layer may be suctioned to the lower surface of the stage sequentially from a center portion of the window layer to an outer portion of the window layer when the window layer is suctioned to the lower surface of the stage.

The pressing of the window layer to attach the window layer to the dummy substrate may include providing a roller on the window layer and pressing the roller against the window layer to attach the window layer to the dummy substrate.

The roller may press the window layer while moving from a side of the window layer to another side of the window layer.

The window manufacturing method may further include alternately stacking a plurality of adhesive layers with a plurality of additional window layers on the window layer to couple the adhesive layers and the additional window layers, and removing the dummy substrate and the dummy adhesive layer.

According to aspects of one or more embodiments, the window layer is easily separated from the slip sheet layer when the window layer of a large-area thin plate is transferred, and a crease is prevented or substantially prevented from being generated on a surface of the window layer. Thus, a breakage of the window and damage on a surface of the window are reduced.

BRIEF DESCRIPTION OF THE DRAWINGS

The above and other aspects and advantages of the present disclosure will become readily apparent by reference to the following detailed description when considered in conjunction with the accompanying drawings wherein.

DETAILED DESCRIPTION

Figure 1:
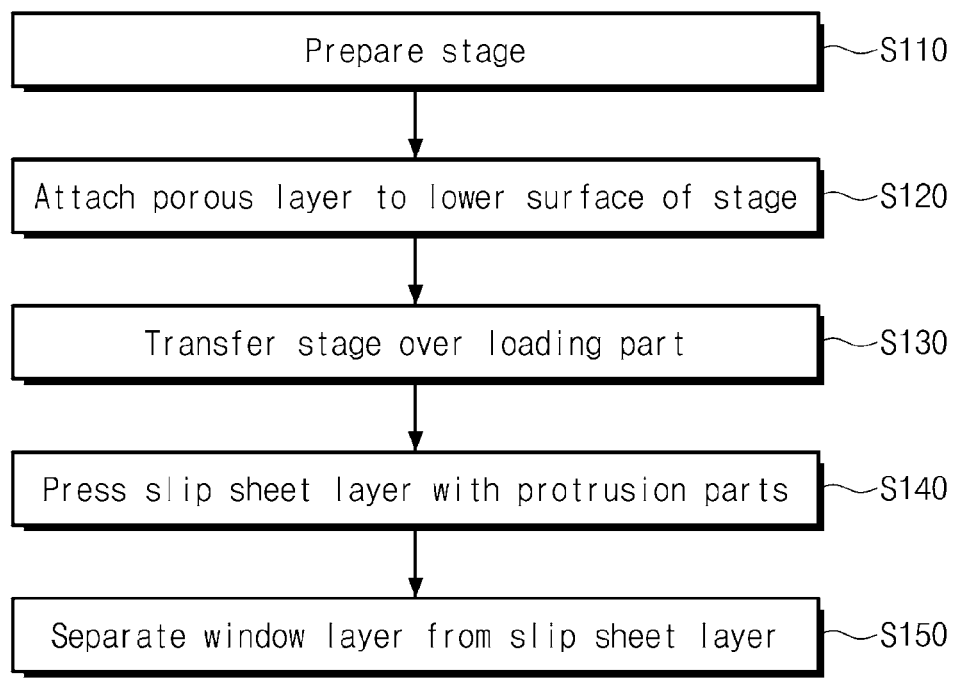
FIG. 1 is a flowchart showing a window transfer method according to an embodiment of the present disclosure.

While some example embodiments of the present inventive concept will be illustrated in the drawings and described in further detail, the present inventive concept may be modified in many alternate forms. Thus, it is to be understood that the description is not intended to limit the inventive concept to the particular forms disclosed, but, rather, is intended to cover all modifications, equivalents, and alternatives falling within the spirit and scope of the present invention.

In the present disclosure, it is to be understood that when an element or layer is referred to as being "on," "connected to," or "coupled to" another element or layer, it may be directly on, connected, or coupled to the other element or layer or one or more intervening elements or layers may be present.

Like numerals refer to like elements throughout. In the drawings, the thickness, ratio, and dimensions of components may be exaggerated for effective description of the technical content.

As used herein, the term "and/or" includes any and all combinations of one or more of the associated listed items.

It is to be understood that, although the terms "first," "second," etc. may be used herein to describe various elements, these elements should not be limited by these terms. These terms are used to distinguish one element from another element. Thus, a first element discussed below could be termed a second element without departing from the teachings of the present disclosure. As used herein, the singular forms, "a," "an," and "the" are intended to include the plural forms as well, unless the context clearly indicates otherwise.

Spatially relative terms, such as "beneath," "below," "lower," "above," "upper," and the like, may be used herein for ease of description to describe one element or feature's relationship to one or more other elements or features as illustrated in the figures.

It is to be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It is to be further understood that terms, such as those defined in commonly used dictionaries, should be interpreted as having a meaning that is consistent with their meaning in the context of the relevant art and are not to be interpreted in an idealized or overly formal sense unless expressly so defined herein.

Herein, the present disclosure will be explained in further detail with reference to the accompanying drawings.

Figure 2:
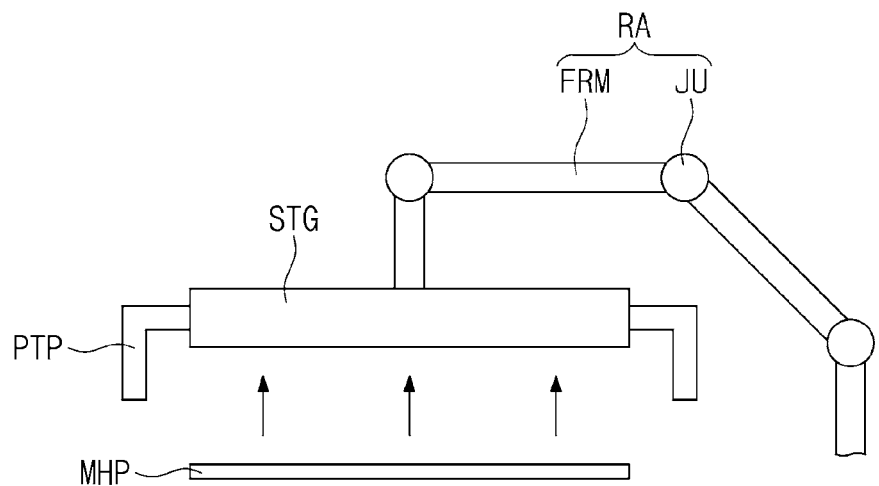
FIG. 2 is a side view showing a stage to which a porous layer is attached.

FIG. 1 is a flowchart showing a window transfer method according to an embodiment of the present disclosure; and FIG. 2 is a side view showing a stage STG to which a porous layer MHP is attached.

Referring to FIGS. 1 and 2, the stage STG may be prepared (S110). The stage STG may be connected to a robot arm RA and may be transferred by the robot arm RA.

The robot arm RA may include a plurality of frames FRM and a plurality of joint units JU. The joint units JU may be disposed between each two adjacent frames FRM, and the frames FRM may be rotatably coupled to each other by the joint units JU. As an example, FIG. 2 shows three joint units JU; however, the number of the joint units JU of the robot arm RA is not limited thereto or thereby.

The stage STG may be connected to a frame FRM positioned at an end of the frames FRM. A center portion of the stage STG may be connected to an end of the frame FRM that is positioned at an end of the frames FRM.

A plurality of protrusion parts PTP may be formed on side surfaces of the stage STG. The protrusion parts PTP may protrude in a direction substantially perpendicular to the side surfaces of the stage STG and may extend from a protruding end to a direction substantially perpendicular to the protruding direction. The protrusion parts PTP may extend downward of the stage STG. The protrusion parts PTP may extend further downward than a lower surface of the stage STG.

The protrusion parts PTP are shown as being integrally formed with the stage STG; however, the present disclosure is not limited thereto or thereby. According to an embodiment, the protrusion parts PTP may be attached to the side surfaces of the stage STG after being manufactured separately from the stage STG.

The porous layer MHP may be attached to the lower surface of the stage STG (S120). In an embodiment, the porous layer MHP may be attached to the stage STG by an adhesive. In an embodiment, the porous layer MHP may include ultrahigh molecular weight polyethylene (UHMWP); however, the porous layer MHP is not limited thereto or thereby.

Figure 3:
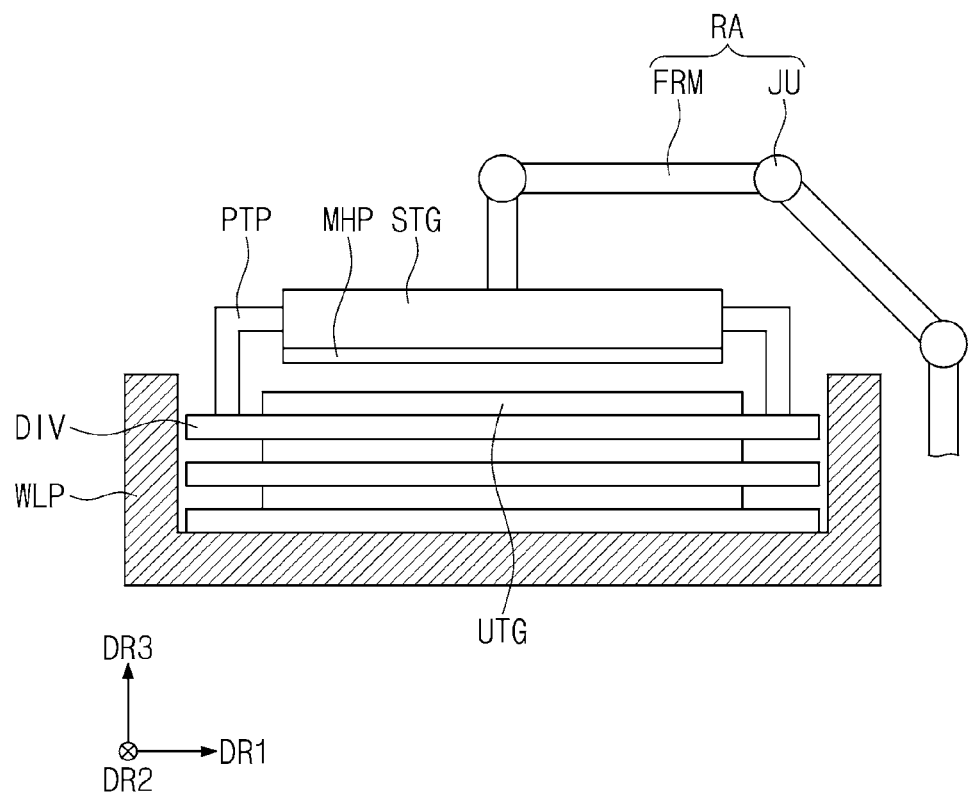
FIG. 3 is a side view showing a stage disposed over a loading part.

FIG. 3 is a side view showing the stage STG disposed over a loading part WLP.

For the convenience of explanation, the loading part WLP, window layers UTG, and slip sheet layers DIV are shown in cross-section.

Referring to FIGS. 1 and 3, the stage STG may be transferred over the loading part WLP in which the window layers UTG are disposed (S130).

The window layers UTG and the slip sheet layers DIV may be loaded in the loading part WLP. The slip sheet layers DIV and the window layers UTG may be alternately stacked with each other in the loading part WLP. As an example, three slip sheet layers DIV and three window layers UTG are shown disposed in the loading part WLP; however, the number of the slip sheet layers DIV and the number of the window layers UTG are not limited thereto or thereby.

The window layers UTG may be distinguished or separated from each other by the slip sheet layers DIV. The slip sheet layers DIV may include a porous paper; however, the present disclosure is not limited thereto or thereby. In the loading part WLP, the slip sheet layer DIV may be disposed at a lowermost position, and at least one slip sheet layer DIV may be disposed between the window layers UTG.

The slip sheet layers DIV may protect a surface of the window layers UTG. The slip sheet layers DIV may prevent or substantially prevent the window layers UTG from being scratched or damaged due to friction or impact.

When viewed in a second direction DR2, the slip sheet layers DIV and the window layers UTG may include long sides in a first direction DR1. In an embodiment, a width in the first direction DR1 of the slip sheet layers DIV may be greater than a width in the first direction DR1 of the window layers UTG.

The slip sheet layers DIV may be pressed by the protrusion parts PTP (S140).

The stage STG may be transferred close to an upper surface of a window layer UTG which is disposed at an uppermost position in the loading part WLP by the robot arm RA. The slip sheet layer DIV disposed under the window layer UTG which is disposed at the uppermost position in the loading part WLP, and exposed outside, or without being covered by, the window layer UTG which is disposed at the uppermost position in the loading part WLP, may be pressed to a third direction DR3 by the protrusion parts PTP.

The protrusion parts PTP may be placed outside the window layer UTG which is disposed at the uppermost position in the loading part WLP, and, thus, the protrusion parts PTP may not be in contact with the window layer UTG which is disposed at the uppermost position in the loading part WLP.

Figure 4:
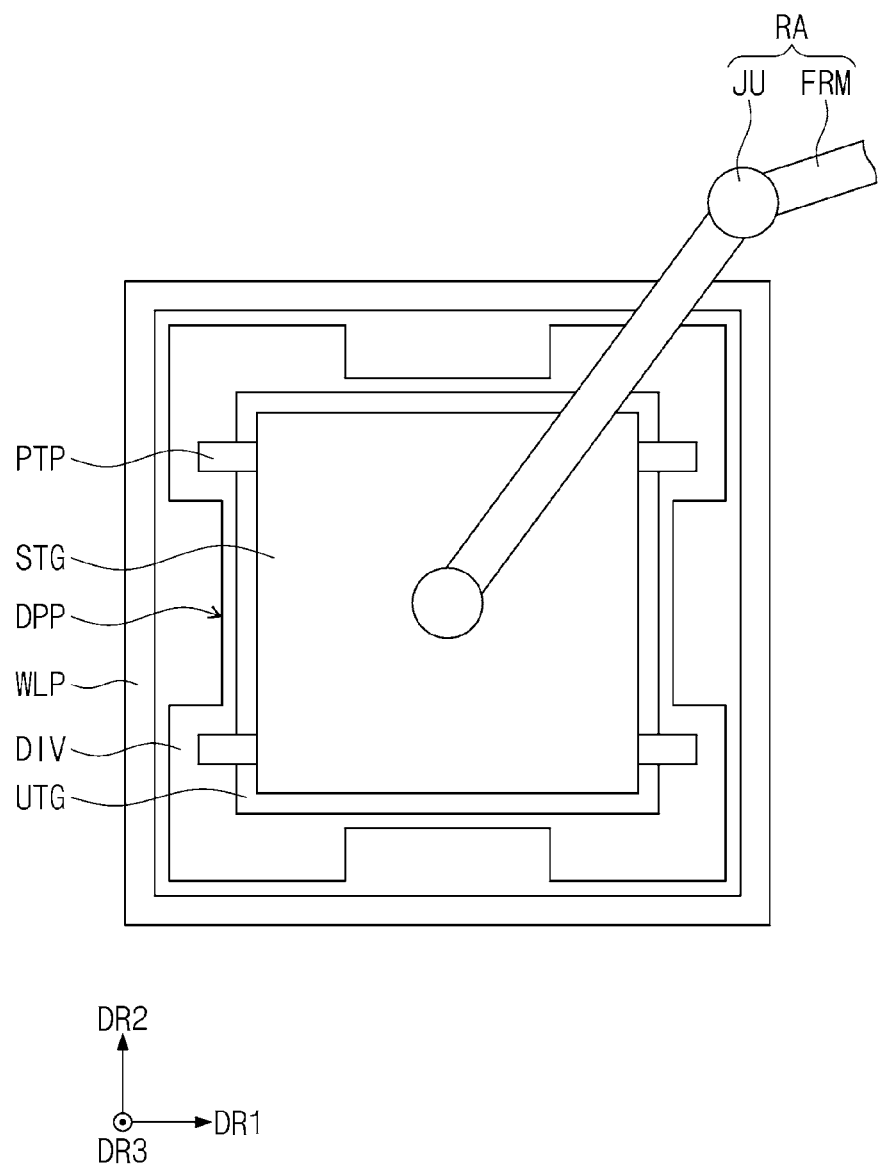
FIG. 4 is a plan view showing a window manufacturing system.

FIG. 4 is a plan view showing the stage STG disposed over the loading part WLP.

The slip sheet layer DIV may have a plane defined by the first direction DR1 and the second direction DR2. In an embodiment, side surfaces perpendicular to the plane of the slip sheet layer DIV may be provided with a plurality of recessed portions DPP defined therein and recessed in a direction toward a center portion of the slip sheet layer DIV.

A width between one recessed portion DPP and another recessed portion DPP facing the one recessed portion DPP may be equal to or greater than the width of the window layer UTG.

When the window layers UTG are loaded in the loading part WLP, the window layers UTG may be aligned by the recessed portions DPP. When one window layer UTG is disposed in the loading part WLP and one slip sheet layer DIV is disposed on the window layer UTG, the window layer UTG may be covered by the slip sheet layer DIV. When a next window layer UTG is disposed, a distance from side surfaces of the window layers UTG to the recessed portions DPP may be adjusted, and, thus, the window layers UTG may be aligned.

The window layers UTG may include a plane defined by the first direction DR1 and the second direction DR2. When viewed in the third direction DR3, the window layers UTG may overlap the slip sheet layers DIV. In an embodiment, the window layers UTG may include a glass material.

The stage STG may include a plane defined by the first direction DR1 and the second direction DR2. When viewed in the third direction DR3, the stage STG may overlap the window layers UTG.

The protrusion parts PTP may protrude from the side surfaces of the stage STG, which are opposite to each other in the first direction DR1, to the first direction DR1. The protrusion parts PTP may extend from the side surfaces of the stage STG to portions of the slip sheet layers DIV that do not overlap the window layers UTG.

Figure 5A:
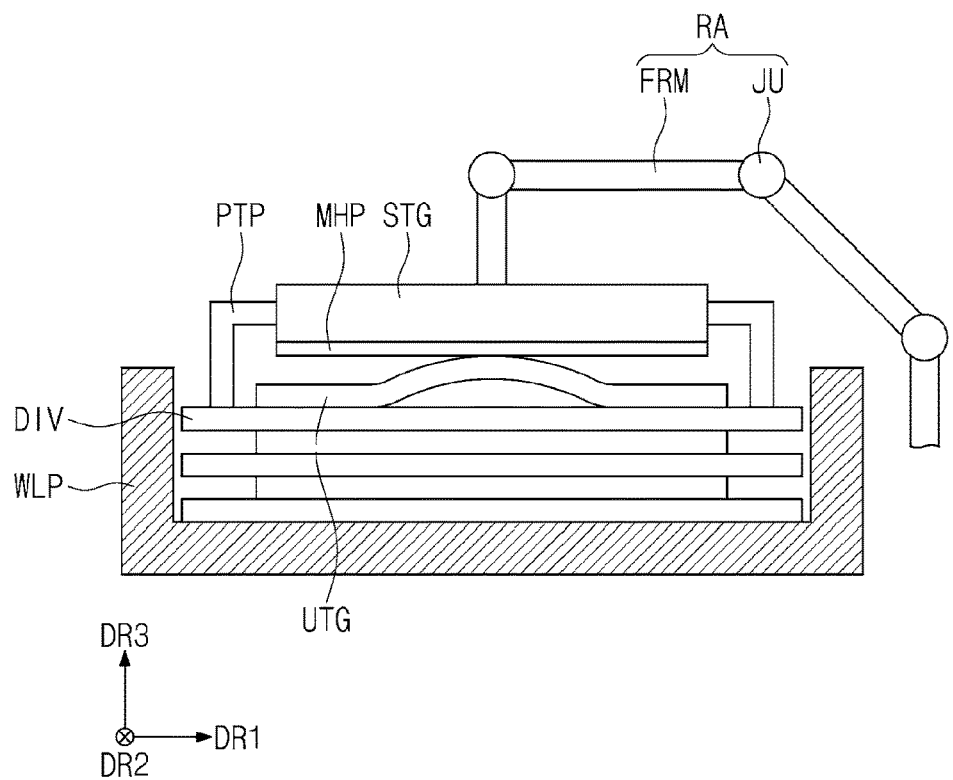
FIGS. 5A and 5B are views showing processes in which a window layer is suctioned and attached to a stage.
Figure 5B:
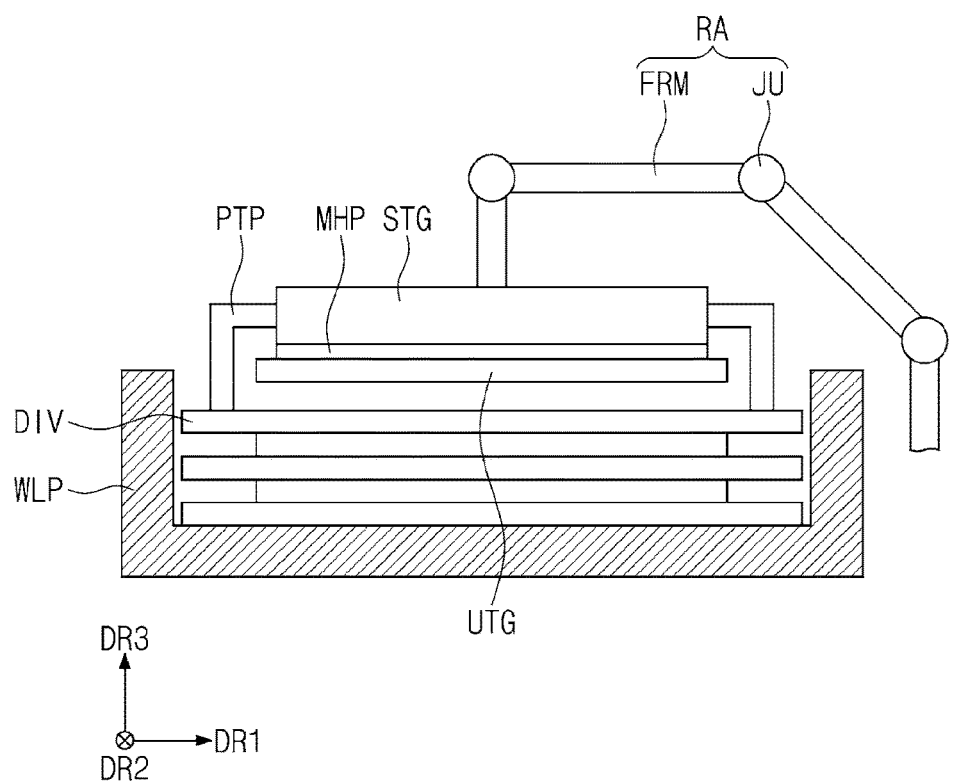
Figure 5C:
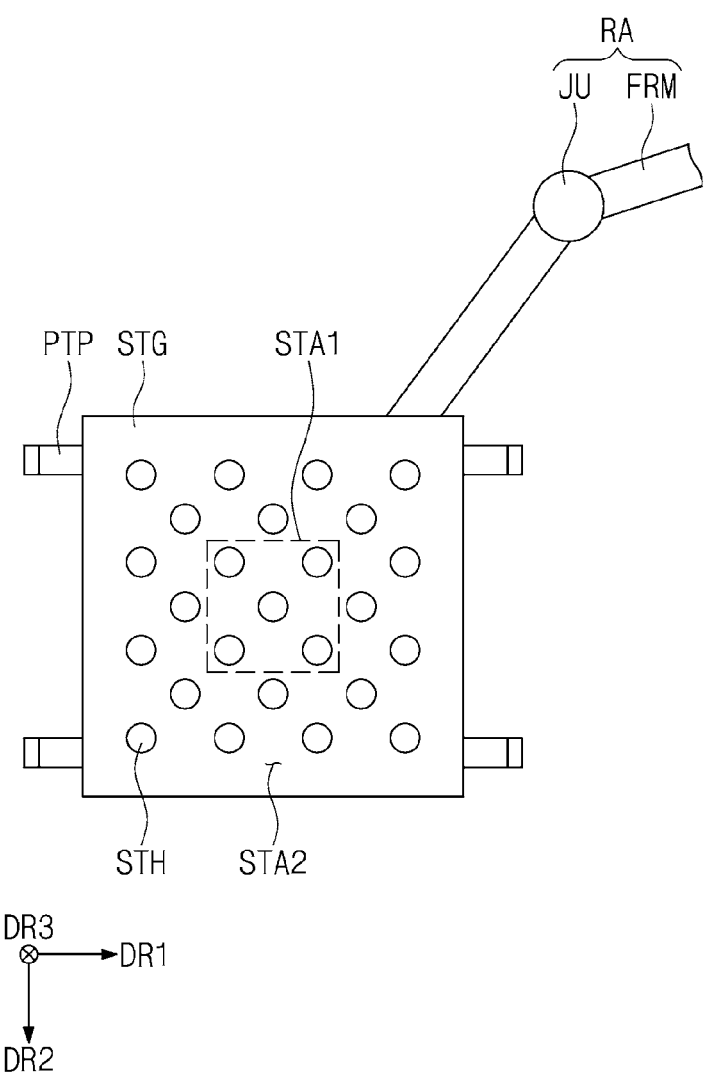
FIG. 5C is a view showing a lower surface of a stage in a third direction.

FIGS. 5A and 5B are views showing processes in which the window layer UTG is suctioned and attached to the stage STG. FIG. 5C is a view showing the lower surface of the stage STG in the third direction DR3.

A process in which the window layers UTG are separated from the slip sheet layers DIV and attached to the stage STG will be described with reference to FIGS. 1, 5A, 5B, and 5C. Herein, a window layer UTG disposed at an uppermost position among the window layers UTG and a slip sheet layer DIV disposed at an uppermost position among the slip sheet layers DIV will be described as a representative example of the present disclosure.

The window layer UTG may be separated from the slip sheet layer DIV by suctioning the window layer UTG to attach the window layer UTG to the lower surface of the stage STG (S150).

The stage STG may be in contact with the window layer UTG by the porous layer MHP or may be disposed adjacent to the upper surface of the window layer UTG to such an extent that the window layer UTG may be attached by a suction force of the lower surface of the stage STG. The stage STG may not be in contact with the slip sheet layer DIV to prevent or substantially prevent the slip sheet layer DIV from being attached to the stage STG.

Static electricity may be prevented or substantially prevented from being generated between the stage STG and the window layer UTG by the porous layer MHP attached to the lower surface of the stage STG. When static electricity is generated between the stage STG and the window layer UTG, the slip sheet layer DIV may be attached to a lower portion of the window layer UTG. When the window layer UTG is suctioned to be attached to the lower surface of the stage STG, the slip sheet layer DIV may be attached together with the window layer UTG.

When the window layer UTG is suctioned to be attached to the lower surface of the stage STG, it is possible to prevent or substantially prevent the slip sheet layer DIV from being attached together with the window layer UTG by the porous layer MHP.

A plurality of holes STH may be defined in the lower surface of the stage STG. The holes STH may be arranged in the first direction DR1 and the second direction DR2. The stage STG may have a vacuum suction structure in which the window layer UTG is vacuum-suctioned through the holes STH. As an example, twenty-five holes STH are shown; however, the number of the holes STH of the lower surface of the stage STG is not limited thereto or thereby.

The porous layer MHP may be provided with a plurality of voids defined therein, and air may pass through the voids. The window layer UTG may be in contact with the porous layer MHP and thus may be vacuum-suctioned to the stage STG. The window layer UTG may be suctioned to the stage STG due to the voids even though the window layer UTG is not directly in contact with the stage STG. When the window layer UTG is suctioned to the stage STG, damage to a surface of the window layer UTG may be prevented or substantially prevented due to the porous layer MHP.

In an embodiment, a first hole area STA1 including five holes STH may be defined in a center portion of the lower surface of the stage STG, and a second hole area STA2 may be defined in a portion of the lower surface of the stage STG other than the first hole area STA1. However, the first hole area STA1 and the second hole area STA2 are not limited thereto or thereby and may be defined in various ways. In addition, more than two areas may be defined in the lower surface of the stage STG.

After the stage STG is disposed on the window layer UTG, a center portion of the window layer UTG, which corresponds to the first hole area STA1 of the stage STG, may be suctioned to the first hole area STA1.

After the center portion of the window layer UTG is attached to the first hole area STA1, an outer portion of the window layer UTG, which corresponds to the second hole area STA2 of the stage STG, may be suctioned to the second hole area STA2.

That is, the window layer UTG may be suctioned to the lower surface of stage STG sequentially from the center portion of the window layer UTG to the outer portion of the window layer UTG. Accordingly, it is possible to prevent or substantially prevent a crease or the like from being formed in the window layer UTG.

When the window layer UTG is suctioned to the stage STG, the slip sheet layer DIV may be separated from the window layer UTG without being suctioned to the stage STG due to the protrusion parts PTP pressing the slip sheet layer DIV.

In an embodiment, although not shown in figures, the slip sheet layer DIV separated from the window layer UTG may be removed from the loading part WLP by being suctioned to a separate vacuum suction device.

Figure 6:
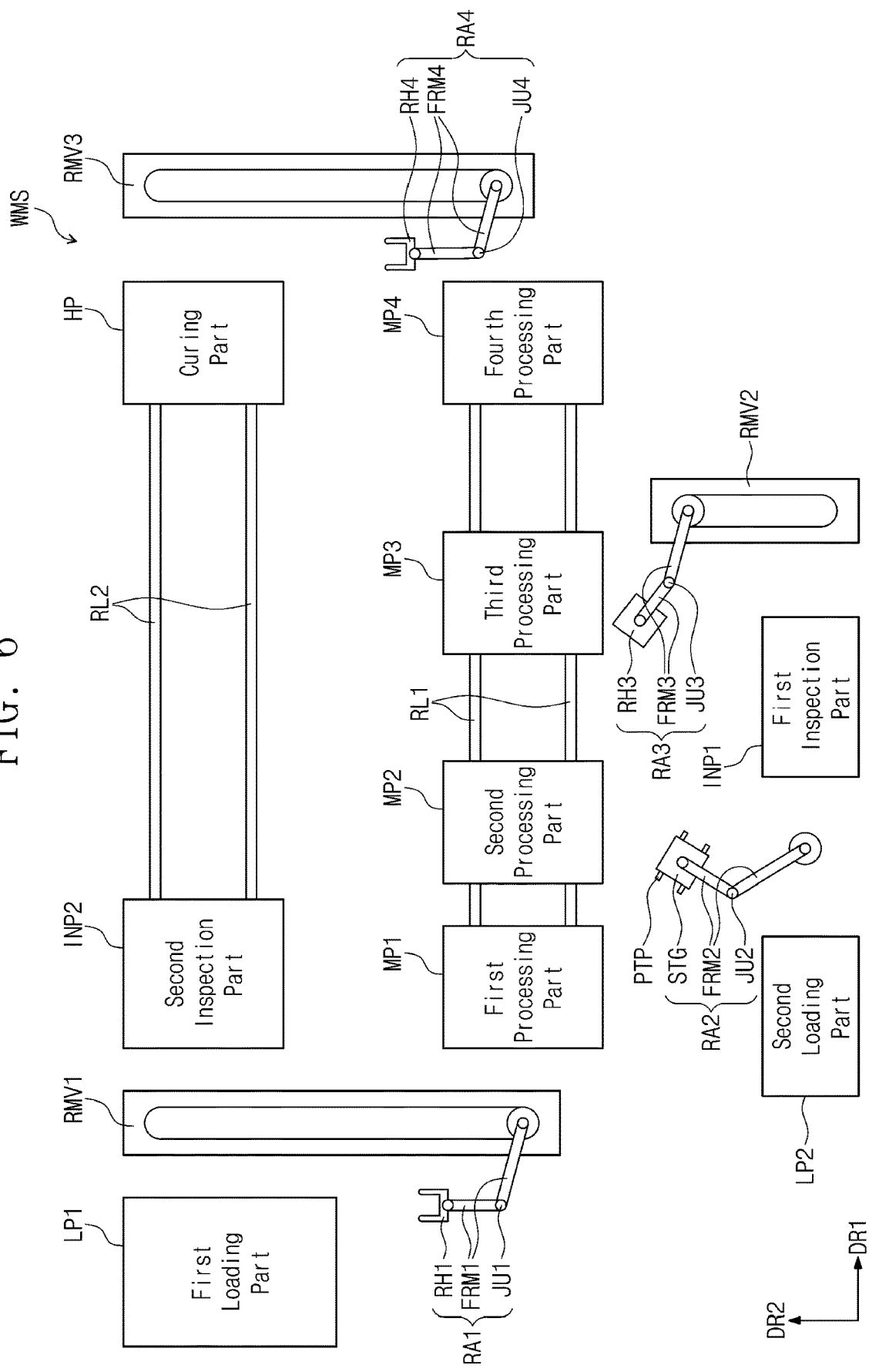
FIG. 6 is a block diagram showing a window manufacturing system using a window transfer method according to an embodiment of the present disclosure.

FIG. 6 is a block diagram showing a window manufacturing system WMS using the window transfer method according to an embodiment of the present disclosure.

Referring to FIG. 6, the window manufacturing system WMS may include a first loading part LP1, a second loading part LP2, a first processing part MP1, a second processing part MP2, a third processing part MP3, a fourth processing part MP4, a first inspection part INP1, a second inspection part INP2, a curing part HP, a first robot arm RA1, a second robot arm RA2, a third robot arm RA3, and a fourth robot arm RA4.

The first processing part MP1, the second processing part MP2, the third processing part MP3, and the fourth processing part MP4 may be arranged in the first direction DR1. As an example, the first processing part MP1, the second processing part MP2, the third processing part MP3, and the fourth processing part MP4 may be sequentially arranged in a rightward direction.

In an embodiment, the first processing part MP1, the second processing part MP2, the third processing part MP3, and the fourth processing part MP4 may be connected to each other by a first rail RL1 extending in the first direction DR1.

The curing part HP and the second inspection part INP2 may be spaced apart from the first processing part MP1, the second processing part MP2, the third processing part MP3, and the fourth processing part MP4 in the second direction DR2 and may be arranged in the first direction DR1. As an example, the second inspection part INP2 and the curing part HP may be sequentially arranged in the rightward direction. The second direction DR2 may intersect with the first direction DR1.

In an embodiment, the curing part HP and the second inspection part INP2 may be connected to each other by a second rail RL2 extending in the first direction DR1. The curing part HP may be disposed adjacent to the fourth processing part MP4 in the second direction DR2. The second inspection part INP2 may be disposed adjacent to the first processing part MP1 in the second direction DR2.

The second loading part LP2 and the first inspection part INP1 may be spaced apart from the first processing part MP1, the second processing part MP2, the third processing part MP3, and the fourth processing part MP4 in the second direction DR2 and may be arranged in the first direction DR1. As an example, the second loading part LP2 and the first inspection part INP1 may be sequentially arranged in the rightward direction.

A plurality of dummy substrates may be loaded in the first loading part LP1. Although not shown in the figures, the first loading part LP1 may have a multi-layer structure. The dummy substrates may be loaded on layers of the first loading part LP1, respectively.

A first robot transfer unit RMV1 may extend in the second direction DR2. The first robot transfer unit RMV1 may be disposed between the first processing part MP1 and the first loading part LP1. The first robot transfer unit RMV1 may be disposed between the second inspection part INP2 and the first loading part LP1.

The first robot arm RA1 may be connected to the first robot transfer unit RMV1 and may move in the second direction DR2. Accordingly, the first robot arm RA1 may move between the first processing part MP1 and the first loading part LP1 and between the second inspection part INP2 and the first loading part LP1.

The first robot arm RA1 may transfer a dummy substrate among the dummy substrates. The dummy substrate will be shown in FIGS. 7A to 7D. In an embodiment, the first robot arm RA1 may include a plurality of first frames FRM1, a plurality of first joint units JU1, and a first robot hand RH1, which are rotatably connected to each other. As an example, FIG. 6 shows three first joint units JU1; however, the number of the first joint units JU1 is not limited thereto or thereby. According to an embodiment, the first robot arm RA1 may include four or more first joint units JU1. As an example, the first robot arm RA1 may include a 6-axis articulated robot. The first robot hand RH1 may be connected to the first joint unit JU1 disposed at an end. The first robot hand RH1 may be rotatably connected to the first joint unit JU1 disposed at the end.

The first robot hand RH1 may have a structure in which two bars protrude in a same direction; however, the present disclosure is not limited thereto or thereby. According to an embodiment, the first robot hand RH1 may have a variety of structures. As an example, the first robot hand RH1 may have a structure in which three or more bars protrude.

The first robot arm RA1 may move in the second direction DR2 by the first robot transfer unit RMV1 and may be disposed adjacent to the first loading part LP1. The first robot arm RA1 may transfer a dummy substrate (herein, referred to as the dummy substrate) from the first loading part LP1.

As an example, the dummy substrate may be transferred from the first loading part LP1 onto the first robot hand RH1. The first frames FRM1 and the first robot hand RH1 of the of the first robot arm RA1 may move while rotating, and, thus, the dummy substrate may be transferred outside the first loading part LP1.

The first robot arm RA1 may move in the second direction DR2 by the first robot transfer unit RMV1 and may be disposed adjacent to the first processing part MP1. The dummy substrate may be provided to the first processing part MP1 by the first robot arm RA1.

The first processing part MP1 may include a stage, and the dummy substrate transferred by the first robot arm RA1 may be disposed on the stage in the first processing part MP1. A process performed by the first processing part MP1 will be described in further detail with reference to FIGS. 7A to 7D. The dummy substrate disposed on the stage may be transferred to the second processing part MP2 by the first rail RL1.

A process of providing an adhesive layer on the dummy substrate may be performed in the second processing part MP2. The process performed in the second processing part MP2 will be described in further detail with reference to FIG. 8.

After the adhesive layer is disposed on the dummy substrate, the stage may be transferred to the third processing part MP3 by the first rail RL1.

The loading part WLP shown in FIG. 3 may be applied to the second loading part LP2. A plurality of slip sheet layers and a plurality of window layers may be loaded in the second loading part LP2.

The robot arm RA shown in FIG. 3 may be applied to the second robot arm RA2. The second robot arm RA2 may be disposed between the second loading part LP2 and the first inspection part INP1. The second robot arm RA2 may transfer the window layers.

In an embodiment, the second robot arm RA2 may include a plurality of second frames FRM2, second joint units JU2, and the stage STG, which are rotatably coupled to each other. As an example, FIG. 6 shows three second joint units JU2; however according to an embodiment, the second robot arm RA2 may include four or more second joint units JU2. As an example, the second robot arm RA2 may include a 6-axis articulated robot.

The second robot arm RA2 may transfer a window layer from the second loading part LP2. The window layer may be transferred to outside the second loading part LP2 by the second robot arm RA2.

The window layer may be provided to the first inspection part INP1 by the second robot arm RA2.

The first inspection part INP1 may include a stage, and the window layer transferred by the second robot arm RA2 may be disposed on the stage in the first inspection part INP1. An inspection process may be performed on the window layer disposed on the stage in the first inspection part INP1.

A second robot transfer unit RMV2 may extend in the second direction DR2. The second robot transfer unit RMV2 may be disposed on a right side of the first inspection part INP1. The second robot transfer unit RMV2 may be disposed adjacent to the third processing part MP3.

The third robot arm RA3 may be connected to the second robot transfer unit RMV2 and may move in the second direction DR2. Accordingly, the third robot arm RA3 may move to the right side of the first inspection part INP1 and a lower side of the third processing part MP3.

The third robot arm RA3 may transfer the window layer inspected in the first inspection part INP1. In an embodiment, the third robot arm RA3 may include a plurality of third frames FRM3, third joint units JU3, and a third robot hand RH3, which are rotatably coupled to each other. As an example, FIG. 6 shows three third joint units JU3; however, the number of the third joint units JU3 is not limited to three. According to an embodiment, the third robot arm RA3 may include four and more third joint units JU3. As an example, the third robot arm RA3 may include a 6-axis articulated robot. The third robot hand RH3 may be connected to the third joint unit JU3 disposed at an end of the third joint units JU3. The third robot hand RH3 may be connected to the third joint unit JU3 disposed at the end of the third joint units JU3 and may be rotated.

In an embodiment, the third robot hand RH3 may have a plate shape. The third robot hand RH3 may have a vacuum suction structure in which the window layer is vacuum-suctioned through a plurality of holes defined through a lower surface of the third robot hand RH3.

The window layer inspected in the first inspection part INP1 may be attached to the third robot hand RH3 and may be transferred to outside the first inspection part INP1.

The third robot arm RA3 may move in the second direction DR2 by the second robot transfer unit RMV2 and may be disposed adjacent to the third processing part MP3. Although not shown in figures, defective window layers may be discarded to the outside.

The window layer may be provided to the third processing part MP3 by the third robot arm RA3.

A process of providing the window layer on the adhesive layer coated on the dummy substrate may be performed in third processing part MP3. The process performed in the third processing part MP3 will be described in further detail with reference to FIG. 9B.

After the window layer is provided on the adhesive layer, the stage on which the dummy substrate, the adhesive layer, and the window layer are disposed may be transferred to the fourth processing part MP4 by the first rail RL1.

The fourth processing part MP4 may include a press unit. A process of pressing the window layer may be performed in the fourth processing part MP4. The process performed in the fourth processing part MP4 will be described in further detail with reference to FIG. 10.

A third robot transfer unit RMV3 may be disposed on a right side of the fourth processing part MP4 and the curing part HP.

In an embodiment, the fourth robot arm RA4 may have substantially the same structure as that of the first robot arm RA1 and may include a plurality of fourth frames FRM4, fourth joint units JU4, and a fourth robot hand RH4. The fourth robot arm RA4 may be connected to the third robot transfer unit RMV3 and may move in the second direction DR2. Accordingly, the fourth robot arm RA4 may move to the right side of the fourth processing part MP4 and the curing part HP.

The dummy substrate to which the window layer is attached may be separated from the stage by the fourth robot arm RA4 and may be transferred to the curing part HP. The dummy substrate may be disposed on another stage of the curing part HP.

A process of curing the adhesive layer on the dummy substrate may be performed in the curing part HP. The adhesive layer is cured, and, thus, the window layer may be attached to the dummy substrate. The process performed in the curing part HP will be described in further detail with reference to FIG. 11.

After the adhesive layer is cured between the dummy substrate and the window layer, the stage on which the dummy substrate is disposed may be transferred to the second inspection part INP2 by the second rail RL2.

A process of inspecting the dummy substrate to which the window layer is attached may be performed in the second inspection part INP2. That is, the dummy substrate, the adhesive layer, and the window layer may be inspected in the second inspection part INP2. As an example, scratches and damage on a surface of the window layer may be inspected. A coating state and a leakage state of the adhesive layer may be inspected in the second inspection part INP2.

The first processing part MP1, the second processing part MP2, the third processing part MP3, the fourth processing part MP4, the curing part HP, the second inspection part INP2, and the first inspection part INP1 may be defined as spaces separated from each other depending on the types of processes performed therein.

Although not shown in figures, the first loading part LP1, the second loading part LP2, the first processing part MP1, the second processing part MP2, the third processing part MP3, the fourth processing part MP4, the first inspection part INP1, the second inspection part INP2, the curing part HP, the first robot arm RA1, the second robot arm RA2, the third robot arm RA3, and the fourth robot arm RA4 may be arranged in a process chamber used to manufacture the window.

Figure 7A:
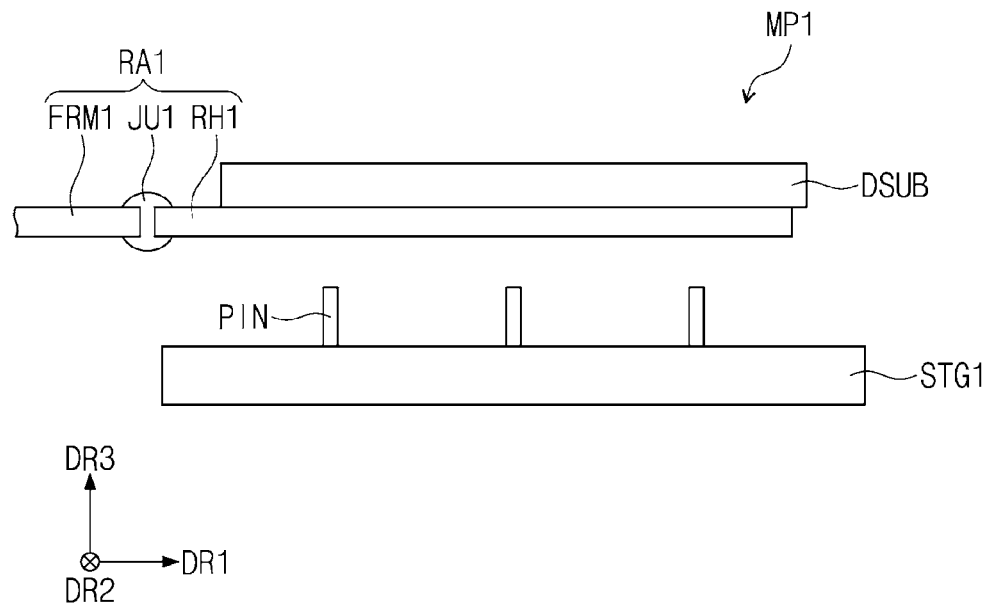
FIG. 7A is side view showing a first processing part to illustrate a process performed in the first processing part.
Figure 7B:
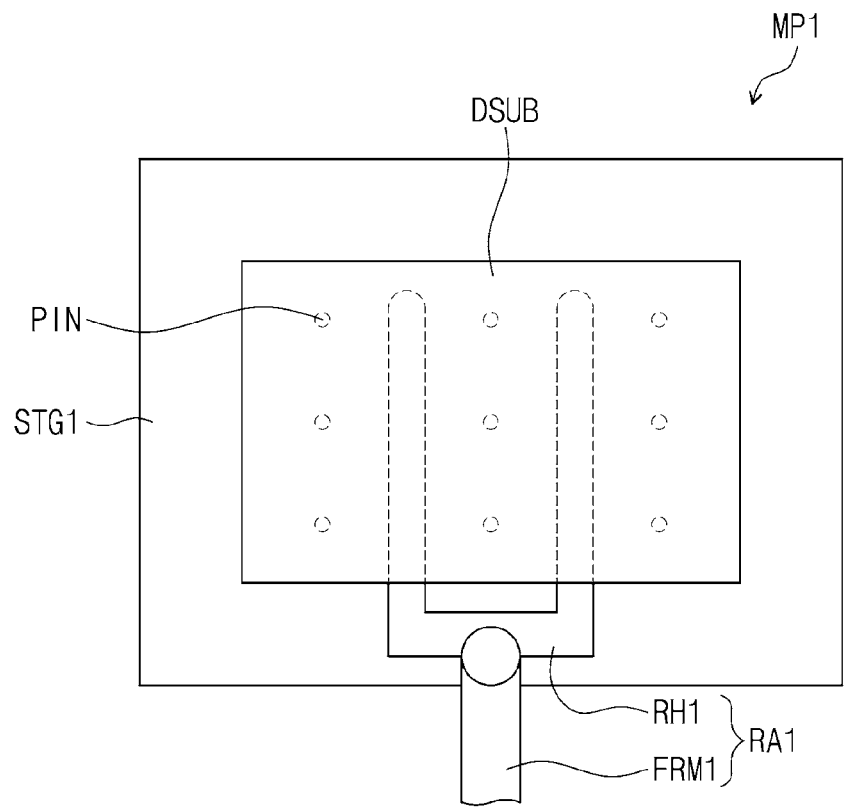
FIG. 7B is a plan view showing a first processing part to illustrate a process performed in the first processing part.
Figure 7C:
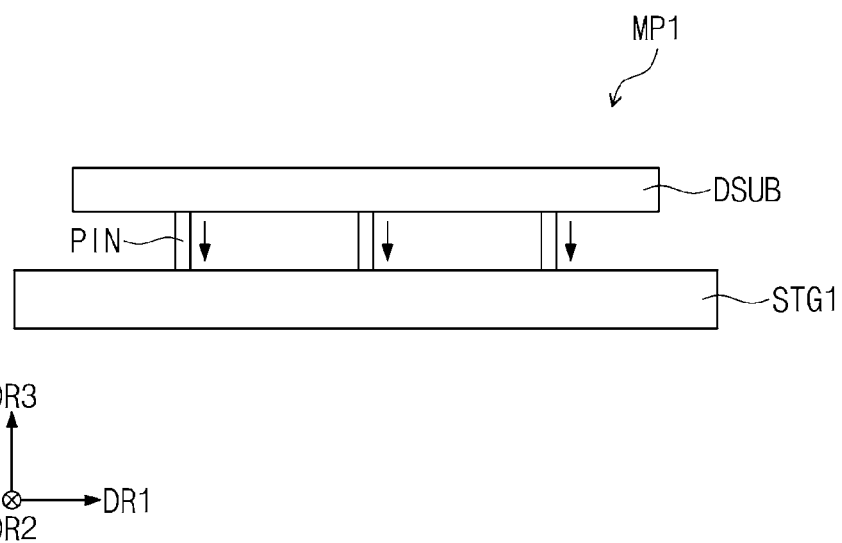
FIGS. 7C, and 7D are side views showing a first processing part to illustrate a process performed in the first processing part.
Figure 7D:
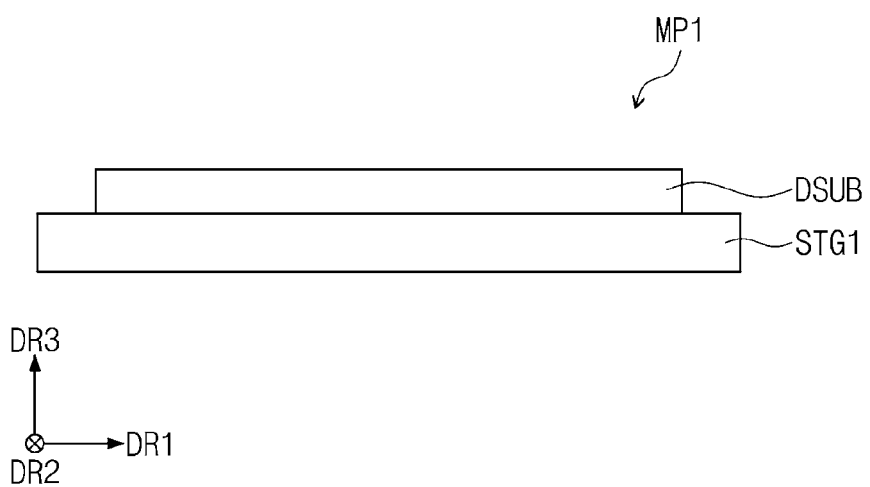

FIG. 7A is side view showing the first processing part MP1 to illustrate the process performed in the first processing part MP1; FIG. 7B is a plan view showing the first processing part MP1 to illustrate a process performed in the first processing part MP1; and FIGS. 7C, and 7D are side views showing the first processing part MP1 to illustrate a process performed in the first processing part MP1.

Referring to FIGS. 7A to 7D, a first stage STG1 may include a plane defined by the first direction DR1 and the second direction DR2. The first stage STG1 may include a plurality of pins PIN. The pins PIN may extend from an upper surface of the first stage STG1 to the third direction DR3.

A dummy substrate DSUB may be disposed on the first robot hand RH1 of the first robot arm RA1. The dummy substrate DSUB may be disposed on the pins PIN of the upper surface of the first stage STG1 by the rotation and movement of the first robot hand RH1 and the first frames FRM1. When viewed in a plane, the pins PIN may not overlap the first robot hand RH1.

After the dummy substrate DSUB is disposed on the pins PIN, the first robot arm RA1 may be removed. After the dummy substrate DSUB is disposed on the pins PIN, the pins PIN may move in the opposite direction of the third direction DR3. The pins PIN may move in the opposite direction of the third direction DR3 to enter inside the first stage STG1. The dummy substrate DSUB may move in the opposite direction of the third direction DR3 by the pins PIN and may be transferred onto the first stage STG1. Accordingly, the dummy substrate DSUB may be provided on the first stage STG1.

In an embodiment, although not shown in figures, a plurality of vacuum suction holes may be defined in the first stage STG1, and the dummy substrate DSUB may be fixed to the first stage STG1 by a suction force provided through the vacuum suction holes.

Figure 8:
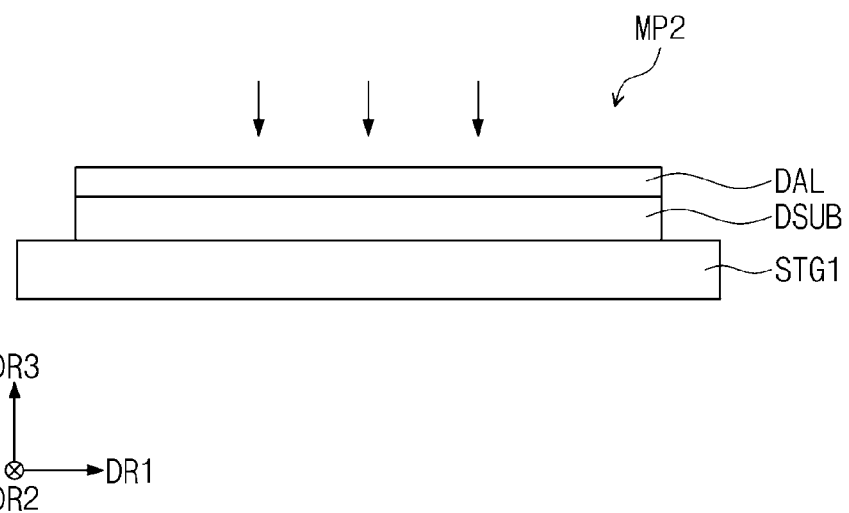
FIG. 8 is a side view showing a second processing part to illustrate a process performed in the second processing part.

FIG. 8 is a side view showing the second processing part MP2 to illustrate the process performed in the second processing part MP2.

Referring to FIG. 8, the process of providing an adhesive layer DAL on the dummy substrate DSUB may be performed in the second processing part MP2.

Although not shown in figures, the second processing part MP2 may include a dispenser to provide the adhesive layer DAL on the dummy substrate DSUB. The dispenser may include an adhesive. The adhesive may be an optically clear resin (OCR); however, the adhesive is not limited thereto or thereby.

The first stage STG1 transferred from the first processing part MP1 may be disposed in the second processing part MP2.

The adhesive may be coated on the dummy substrate DSUB by the dispenser, and, thus, the adhesive layer may be provided on the dummy substrate DSUB. The adhesive layer on the upper surface of the dummy substrate DSUB may be defined as the dummy adhesive layer. The first stage STG1 on which the adhesive layer DAL is formed may be transferred to the third processing part MP3 using the first rail RL1.

Figure 9A:
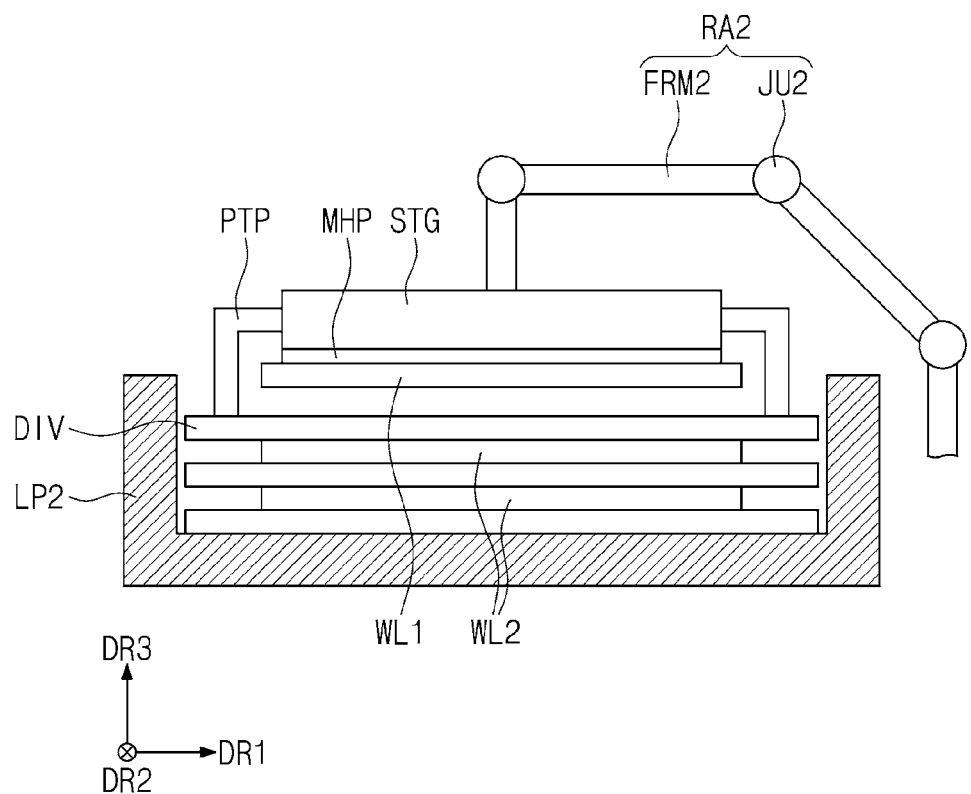
FIG. 9A is a side view showing a second loading part to which a window layer is transferred by a second robot arm.

FIG. 9A is a side view showing the second loading part LP2 from which the window layer is transferred by the second robot arm.

Referring to FIG. 9A, a first window layer WL1, second window layers WL2, and slip sheet layers DIV may be disposed in the second loading part LP2. The slip sheet layer DIV may be disposed at a lowermost position in the second loading part LP2. The second window layers WL2 and the slip sheet layers DIV may be alternately disposed on the slip sheet layer DIV disposed at the lowermost position in the second loading part LP2. The first window layer WL1 may be disposed on the slip sheet layer DIV disposed at an uppermost position in the second loading part LP2. For the convenience of explanation, the first window layer WL1 and the second window layers WL2 are shown; however, the first window layer WL1 and the second window layers WL2 may be the same window layers.

The second robot arm RA2 may transfer the first window layer WL1 from the second loading part LP2. The first window layer WL1 attached to the second robot arm RA2 may be provided to the first inspection part INP1.

After the first window layer WL1 is provided to the first inspection part INP1, the first window layer WL1 may be inspected. As an example, whether the first window layer WL1 is damaged and whether foreign matter is attached to the first window layer WL1 may be inspected. In a case in which the first window layer WL1 is not defective, the first window layer WL1 may be transferred to the third processing part MP3. However, in a case in which the first window layer WL1 is defective, the first window layer WL1 may be discarded.

Figure 9B:
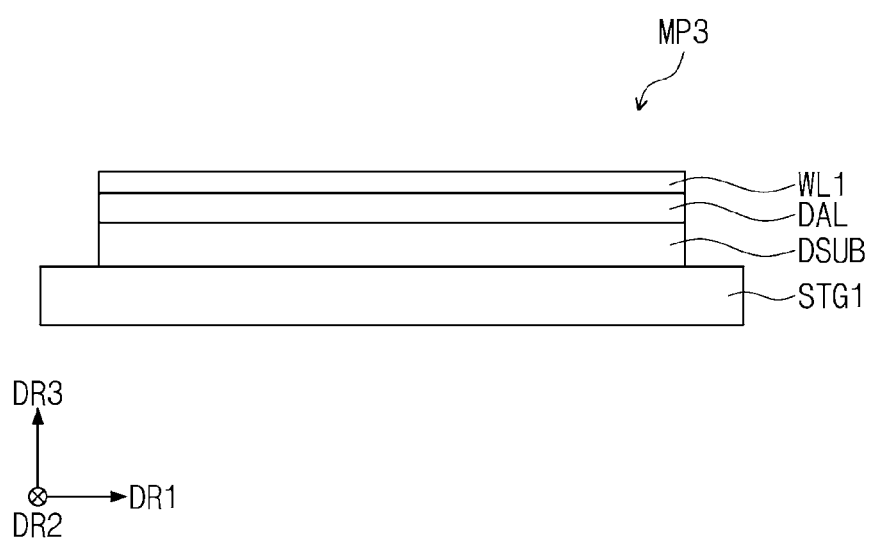
FIG. 9B is a side view showing a third processing part in which a first window layer is disposed on a dummy adhesive layer.

FIG. 9B is a side view showing the third processing part MP3 in which the first window layer WL1 is disposed on the dummy adhesive layer DSUB.

Referring to FIG. 9B, the first window layer WL1 transferred from the third robot arm RA3 may be disposed on the first stage STG1 transferred from the second processing part MP2 in the third processing part MP3. The first window layer WL1 may be disposed on the dummy adhesive layer DAL on the first stage STG1 by the third robot arm RA3.

In an embodiment, the first window layer WL1 may be an ultra-thin glass (UTG). As an example, the first window layer WL1 may have a thickness of about 30 micrometers in the third direction DR3; however, the thickness of the first window layer WL1 is not limited thereto or thereby.

The first stage STG1 on which the first window layer WL1 is disposed may be transferred to the fourth processing part MP4 by the first rail RL1.

Figure 10:
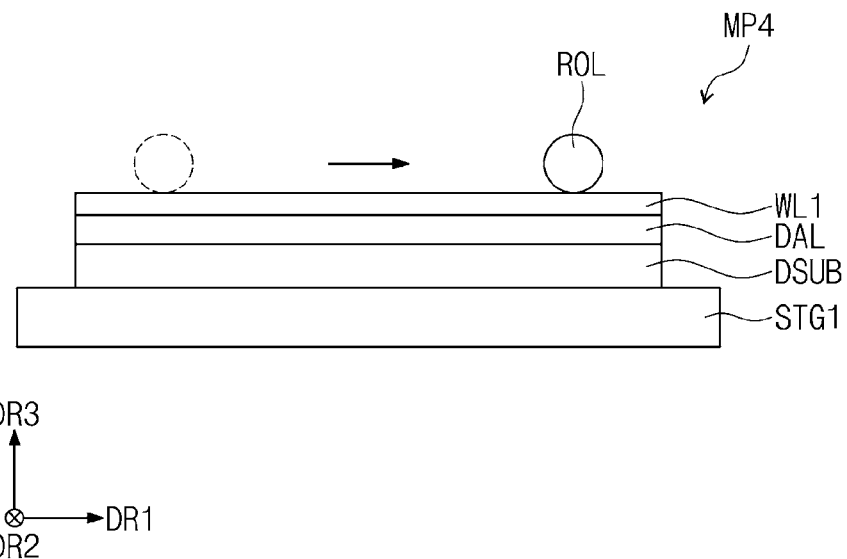
FIG. 10 is a side view showing a fourth processing part to illustrate a process performed in the fourth processing part.

FIG. 10 is a side view showing the fourth processing part MP4 to illustrate the process performed in the fourth processing part MP4.

Referring to FIG. 10, the fourth processing part MP4 may include a roller ROL defined as a press unit.

The roller ROL may have a cylindrical shape extending in the second direction DR2. As an example, the roller ROL may include conductive silicon with heat resistance. The roller ROL may have a hardness of about 70 Shore A. The roller ROL may have a diameter of about 100 mm; however, the present disclosure is not limited thereto or thereby. According to an embodiment, the roller ROL may have any of a variety of shapes.

The roller ROL may be disposed on the first window layer WL1. The first window layer WL1 may be pressed by the roller ROL. The roller ROL may move from a side among opposite sides of the first window layer WL1 to the other side among the opposite sides of the first window layer WL1, which are opposite to each other in the first direction DR1, while pressing the first window layer WL1 to the opposite direction of the third direction DR3. As an example, the roller ROL may have the following process conditions. The roller ROL may be pressed against the first window layer WL1 with a weight of about 60 kg in the opposite direction of the third direction DR3. In an embodiment, the roller ROL may move at a speed of about 10 millimeters per second. In an embodiment, the roller ROL may be pressed against the first window layer WL1 at a room temperature of about 24° C. However, the process conditions of the roller ROL are not limited thereto or thereby. The first window layer WL1 pressed by the roller ROL may be attached to the dummy substrate DSUB by the dummy adhesive layer DAL.

After the first window layer WL1 is attached to the dummy substrate DSUB, the dummy substrate DSUB to which the first window layer WL1 is attached may be transferred to the curing part HP by the fourth robot arm RA4.

Figure 11:
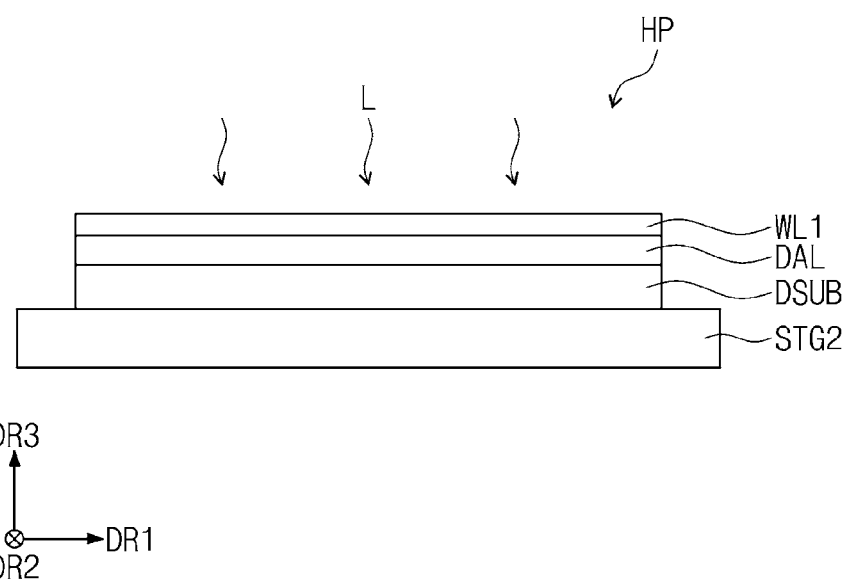
FIG. 11 is a side view showing a process performed in a curing part.

FIG. 11 is a side view showing the process performed in the curing part HP.

Referring to FIG. 11, the dummy substrate DSUB transferred to the curing part HP may be disposed on a second stage STG2. The dummy adhesive layer DAL disposed on the dummy substrate DSUB may be cured by light L provided in the curing part HP. As an example, the light L may be ultraviolet (UV) light; however, the present disclosure is not limited thereto or thereby. The dummy adhesive layer DAL cured by the light L may increase an adhesive force between the first window layer WL1 and the dummy substrate DSUB.

After the dummy adhesive layer DAL is cured, the second stage STG2 may be transferred to the second inspection part INP2 by the second rail RL2. Although not shown in figures, the dummy substrate DSUB, the dummy adhesive layer DAL, and the first window layer WL1 may be inspected in the second inspection part INP2. In an embodiment, the inspection performed in the second inspection part INP2 may be the same as that described with reference to FIG. 6, and, thus, further description thereof will be omitted.

Figure 12:
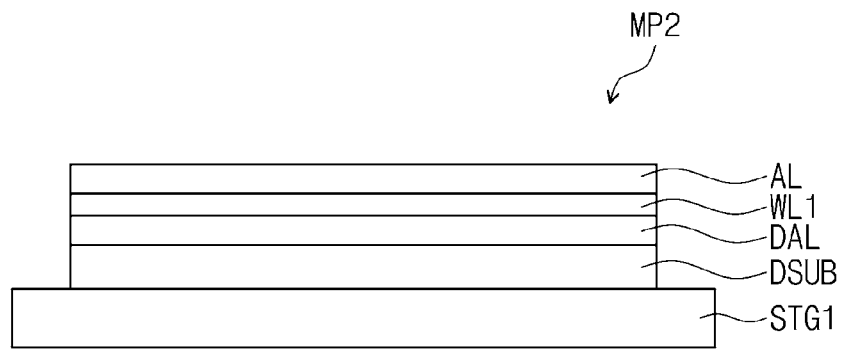
FIG. 12 is a side view showing a second processing part in which an additional process is performed.
Figure 12:
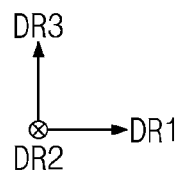

FIG. 12 is a side view showing the second processing part MP2 in which an additional process is performed.

Referring to FIG. 12, the window manufactured by the window manufacturing system WMS may include the window layers. The window layers may include the first window layer WL1 and the second window layers WL2. The second window layers WL2 may be attached to the first window layer WL1 by adhesive layers AL. Herein, the process of providing the second window layers WL2 on the first window layer WL1 will be described in further detail.

The adhesive layers AL and the second window layers WL2 may be attached to the first window layer WL1 in the second, third, and fourth processing parts MP2, MP3, and MP4. Processes of attaching the second window layers WL2 to the first window layer WL1 may be substantially the same as the processes of attaching the first window layer WL1 to the dummy substrate DSUB.

The dummy substrate DSUB to which the first window layer WL1 is attached may be inspected in the second inspection part INP2 and then may be transferred to the first processing part MP1 by the first robot arm RA1. The dummy substrate DSUB transferred to the first processing part MP1 may be disposed on the first stage STG1 of the first processing part MP1. The first stage STG1 may be transferred to the second processing part MP2.

The adhesive may be provided on the first window layer WL1 in the second processing part MP2. The adhesive may be provided on the first window layer WL1, and, thus, the adhesive layer AL may be formed on the first window layer WL1.

After the adhesive layer AL is provided on the first window layer WL1, the first stage STG1 may be transferred to the third processing part MP3 by the first rail RL1.

Figure 13:
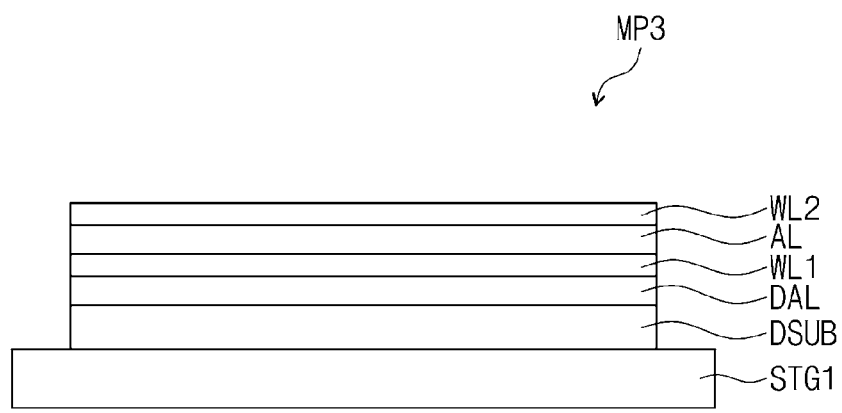
FIG. 13 is a side view showing a third processing part in which an additional process is performed.
Figure 13:
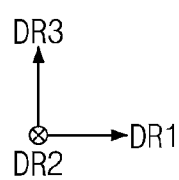

FIG. 13 is a side view showing the third processing part MP3 in which an additional process is performed.

Referring to FIG. 13, the process of providing the second window layer WL2 on the adhesive layer AL of the first stage STG1 transferred from the second processing part MP2 may be performed in the third processing part MP3. As described above, the second window layer WL2 loaded in the second loading part LP2 may be transferred to the first inspection part INP1 by the second robot arm RA2. The second window layer WL2 may be transferred to the third processing part MP3 by the third robot arm RA3 after being inspected in the first inspection part INP1.

After the second window layer WL2 is provided on the adhesive layer AL in the third processing part MP3, the first stage STG1 may be transferred to the fourth processing part MP4 by the first rail RL1.

Figure 14:
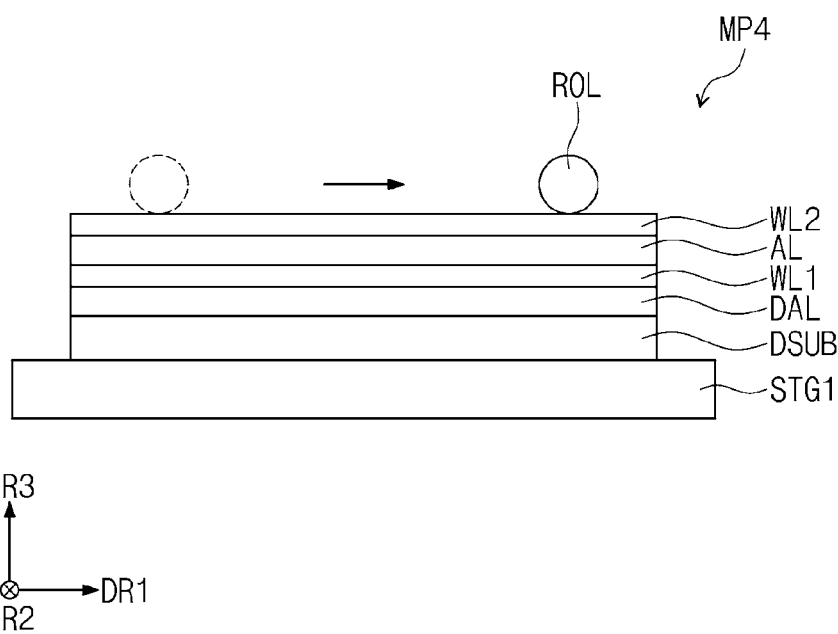
FIG. 14 is a side view showing a fourth processing part in which an additional process is performed.

FIG. 14 is a side view showing the fourth processing part MP4 in which an additional process is performed.

Referring to FIG. 14, the roller ROL may be disposed on the second window layer WL2 on the first stage STG1 transferred from the third processing part MP3 in the fourth processing part MP4. The process of pressing the second window layer WL2 may be performed in the fourth processing part MP4.

The dummy substrate DSUB to which the second window layer WL2 is attached may be separated from the first stage STG1 and may be transferred to the curing part HP by the fourth robot arm RA4.

Although not shown in figures, the dummy substrate DSUB to which the second window layer WL2 is attached may be disposed on the second stage STG2 of the curing part HP. The process of curing the adhesive layer AL disposed on the first window layer WL1 may be performed in the curing part HP.

After the adhesive layer AL is cured between the first window layer WL1 and the second window layer WL2, the second stage STG2 may be transferred to the second inspection part INP2 by the second rail RL2.

The process of inspecting the second window layer WL2 attached onto the first window layer WL1 may be performed in the second inspection part INP2.

The processes described in the above embodiments may be repeatedly performed, and, thus, the second window layers WL2 may be attached to the first window layer WL1 by the adhesive layers AL.

Figure 15:
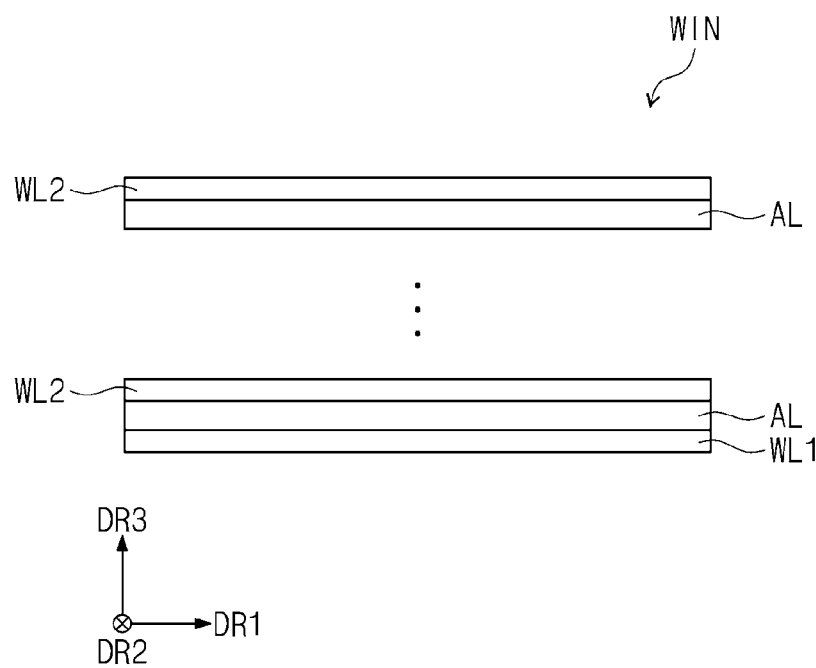
FIG. 15 is a side view showing a window manufactured by the window manufacturing system shown in FIG. 6.

FIG. 15 is a side view showing a window WIN manufactured by the window manufacturing system shown in FIG. 6.

Referring to FIG. 15, the window WIN may include the first window layer WL1 and the second window layers WL2.

Although not shown in figures, the first window layer WL1 and the second window layers WL2 are stacked, and then the dummy substrate DSUB and the dummy adhesive layer DAL are removed, thereby manufacturing the window WIN. As described above, the window WIN may be manufactured by the processes repeatedly performed in the first processing part MP1, the second processing part MP2, the third processing part MP3, the fourth processing part MP4, the curing part HP, and the second inspection part INP2.

As an example, the first and second window layers WL1 and WL2 may be stacked in fifteen layers. However, the number of the first and second window layers WL1 and WL2 stacked in the window WIN is not limited thereto or thereby.

Figure 16:
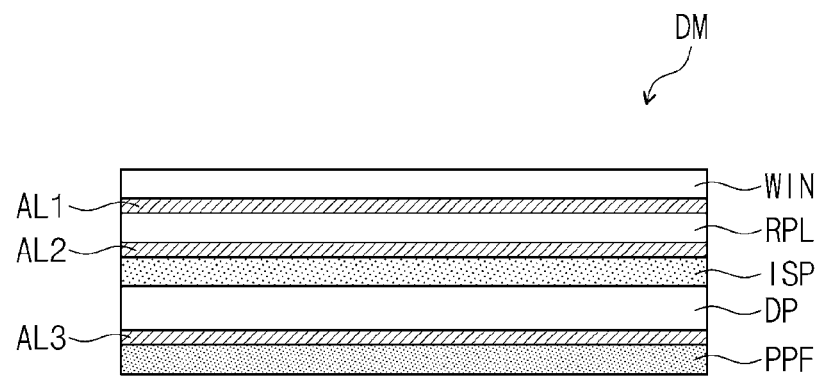
FIG. 16 is a cross-sectional view showing a display module to which a window manufactured according to an embodiment of the present disclosure is applied.

FIG. 16 is a cross-sectional view showing a display module DM to which the window manufactured according to an embodiment of the present disclosure is applied.

Referring to FIG. 16, in an embodiment, the display module DM may include a display panel DP, an input sensing part ISP, an anti-reflective layer RPL, the window WIN, a panel protective layer PPF, a first adhesive layer AL1, a second adhesive layer AL2, and a third adhesive layer AL3. The input sensing part ISP, the anti-reflective layer RPL, and the window WIN may be disposed on the display panel DP, and the panel protective layer PPF may be disposed under the display panel DP.

In an embodiment, the display panel DP may be a flexible display panel. As an example, the display panel DP may include a plurality of electronic elements arranged on a flexible substrate.

According to an embodiment, the display panel DP may be a light emitting type display panel; however, the present disclosure is not limited thereto or thereby. As an example, the display panel DP may be an organic light emitting display panel or a quantum dot light emitting display panel.

A light emitting layer of the organic light emitting display panel may include an organic light emitting material. A light emitting layer of the quantum dot light emitting display panel may include a quantum dot or a quantum rod. Herein, the organic light emitting display panel will be described as a representative example of the display panel DP.

The input sensing part ISP may be disposed on the display panel DP. The input sensing part ISP may include a plurality of sensors (not shown) to sense an external input. In an embodiment, the sensors may sense the external input by a capacitive method. The input sensing part ISP may be directly manufactured on the display panel DP when the display panel DP is manufactured; however, the present disclosure is not limited thereto or thereby. In an embodiment, the input sensing part ISP may be attached to the display panel DP by an adhesive layer after being manufactured separately from the display panel DP.

The anti-reflective layer RPL may be disposed between the input sensing part ISP and the window WIN. The anti-reflective layer RPL may be defined as an external light reflection prevention film. The anti-reflective layer RPL may decrease a reflectance of an external light incident to the display panel DP from above the display module DM. As an example, the anti-reflective layer RPL may include a retarder and/or a polarizer.

The window WIN may be disposed on the anti-reflective layer RPL. The window WIN may protect the display panel DP, the input sensing part ISP, and the anti-reflective layer RPL from external scratches and impacts. The window WIN may be optically transparent.

The panel protective layer PPF may be disposed under the display panel DP. The panel protective layer PPF may be defined as a protective substrate. The panel protective layer PPF may protect a lower portion of the display panel DP. The panel protective layer PPF may include a plastic material. As an example, the panel protective layer PPF may include polyethylene terephthalate (PET).

The first adhesive layer AL1 may be disposed between the window WIN and the anti-reflective layer RPL. The window WIN and the anti-reflective layer RPL may be coupled to each other by the first adhesive layer AL1.

The second adhesive layer AL2 may be disposed between the anti-reflective layer RPL and the input sensing part ISP. The anti-reflective layer RPL and the input sensing part ISP may be coupled to each other by the second adhesive layer AL2.

The third adhesive layer AL3 may be disposed between the display panel DP and the panel protective layer PPF. The display panel DP and the panel protective layer PPF may be coupled to each other by the third adhesive layer AL3.

As an example, the first to third adhesive layers AL1 to AL3 may include a pressure sensitive adhesive; however, the present disclosure is not limited thereto or thereby. The first to third adhesive layers AL1 to AL3 may include any of various adhesives.

In an embodiment, the first to third adhesive layers AL1 to AL3 may include a silicon-based resin, an acrylic-based resin, or a urethane-based resin. The first to third adhesive layers AL1 to AL3 may be formed of a polymer resin including the silicon-based resin, the acrylic-based resin, or the urethane-based resin. As an example, the first to third adhesive layers AL1 to AL3 may be formed of the acrylic-based resin.

Figure 17A:
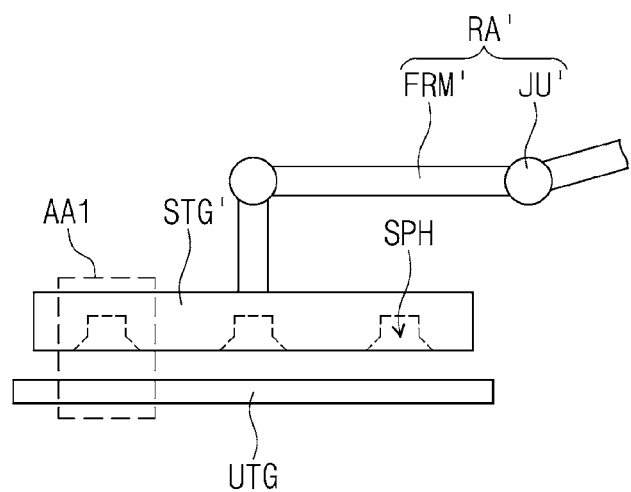
FIG. 17A is a side view showing a robot arm performing a window transfer method according to an embodiment of the present disclosure.
Figure 17B:
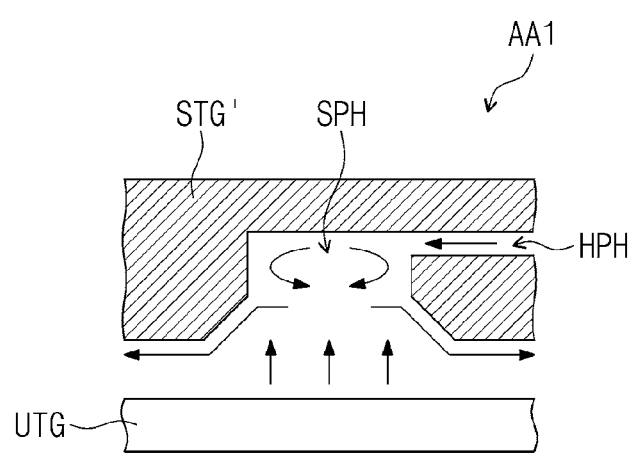
FIG. 17B is an enlarged cross-sectional view showing a region "AA1" of FIG. 17A.

FIG. 17A is a side view showing a robot arm RA' performing the window transfer method according to an embodiment of the present disclosure; and FIG. 17B is an enlarged cross-sectional view showing a region "AA1" of FIG. 17A.

Referring to FIGS. 17A and 17B, the robot arm RA' may include a plurality of frames FRM', a plurality of joint units JU', and a stage STG'.

The stage STG' may be connected to the frame FRM' located at an end position among the frames FRM'. A center portion of the stage STG' may be connected to an end of the frame FRM'.

A plurality of negative pressure holes SPH may be defined in a lower surface of the stage STG'. The stage STG' may be disposed adjacent to the window layer UTG.

In an embodiment, the negative pressure holes SPH having a cylindrical shape may be defined in the stage STG'. In an embodiment, the negative pressure holes SPH may have a width that gradually increases in a direction substantially parallel to the lower surface of the stage STG' as a distance from the lower surface of the stage STG' decreases.

Air injection holes HPH may be defined through an upper portion of the negative pressure holes SPH. An air injection device (not shown) may be connected to a side of the air injection holes HPH continuously formed from the negative pressure holes SPH.

The negative pressure holes SPH may receive a compressed air from the air injection device (not shown) through the air injection holes HPH. When the compressed air is injected into the negative pressure holes SPH, a swirling flow of the compressed air may be generated in the cylindrical-shaped negative pressure holes SPH. A negative pressure may be generated at a center of the swirling flow. An attractive force in a direction toward the negative pressure holes SPH may be generated in the negative pressure holes SPH by the negative pressure.

When the stage STG' is disposed adjacent to the window layer UTG, the window layer UTG may be attracted in the direction to the stage STG' by the negative pressure holes SPH of stage STG'.

The window layer UTG may be floated in the direction toward the stage STG' by the attractive force. When an amount of the attractive force applied to the window layer UTG in the direction toward the stage STG' is substantially the same as an amount of gravity applied to the floated window layer UTG, the window layer UTG may be maintained in the floated state to be adjacent to the lower surface of the stage STG'. That is, the window layer UTG may not be in contact with the stage STG' while being transferred. Accordingly, scratches and damage on the window layer UTG may be reduced.

Although some embodiments of the present disclosure have been described, it is to be understood that the present disclosure is not limited to these embodiments, but various changes and modifications can be made by one of ordinary skill in the art within the spirit and scope of the present disclosure as herein claimed. Therefore, the disclosed subject matter should not be limited to any single embodiment described herein, and the scope of the present inventive concept shall be determined according to the attached claims.

What is claimed is:

1. A window manufacturing method comprising:
   providing a dummy adhesive layer on a dummy substrate;
   suctioning a window layer to a stage to separate the window layer arranged on a slip sheet layer from the slip sheet layer;
   transferring the window layer using the stage to arrange the window layer on the dummy adhesive layer;
   pressing the window layer to attach the window layer to the dummy substrate; and
   curing the dummy adhesive layer,
   the suctioning of the window layer to the stage to separate the window layer from the slip sheet layer comprising:
   pressing the slip sheet layer arranged under the window layer and exposed outside the window layer using a plurality of protrusion parts attached to side surfaces of the stage; and
   suctioning the window layer to a lower surface of the stage to separate the window layer from the slip sheet layer.

2. The window manufacturing method of claim 1, further comprising attaching a porous layer to the lower surface of the stage, wherein the window layer is in contact with the porous layer and is vacuum-suctioned to the stage.

3. The window manufacturing method of claim 1, wherein the slip sheet layer is separated from the window layer by the protrusion parts without being suctioned to the stage.

4. The window manufacturing method of claim 1, wherein the window layer is suctioned to the lower surface of the stage sequentially from a center portion of the window layer to an outer portion of the window layer when the window layer is suctioned to the lower surface of the stage.

5. The window manufacturing method of claim 1, wherein the pressing of the window layer to attach the window layer to the dummy substrate comprises:
   providing a roller on the window layer; and
   pressing the roller against the window layer to attach the window layer to the dummy substrate.

6. The window manufacturing method of claim 5, wherein the roller presses the window layer while moving from a side of the window layer to another side of the window layer.

7. The window manufacturing method of claim 1, further comprising:
   alternately stacking a plurality of adhesive layers with a plurality of additional window layers on the window layer to couple the adhesive layers and the additional window layers; and
   removing the dummy substrate and the dummy adhesive layer.

* * * * *